(12) United States Patent
Nakanishi et al.

(10) Patent No.: US 8,438,588 B2
(45) Date of Patent: May 7, 2013

(54) TURNTABLE FOR A STORAGE DISK APPARATUS INCLUDING FERROMAGNETIC MATERIAL AND A RESIN MEMBER

(75) Inventors: Kosuke Nakanishi, Kyoto (JP); Shinya Tabata, Kyoto (JP); Toshihide Sonoda, Kyoto (JP); Yoshihisa Kitamura, Kyoto (JP)

(73) Assignee: Nidec Corporation, Kyoto (JP)

( * ) Notice: Subject to any disclaimer, the term of this patent is extended or adjusted under 35 U.S.C. 154(b) by 197 days.

(21) Appl. No.: 12/796,048

(22) Filed: Jun. 8, 2010

(65) Prior Publication Data

US 2010/0313212 A1  Dec. 9, 2010

(30) Foreign Application Priority Data

Jun. 8, 2009 (JP) .................................. 2009-137538

(51) Int. Cl.
*G11B 17/028* (2006.01)

(52) U.S. Cl.
USPC .............................. 720/704; 720/707; 720/710

(58) Field of Classification Search .................. 720/703, 720/704, 706, 707, 710
See application file for complete search history.

(56) References Cited

U.S. PATENT DOCUMENTS

| | | | | |
|---|---|---|---|---|
| 6,205,111 | B1 * | 3/2001 | Hayakawa | 720/707 |
| 7,127,732 | B2 * | 10/2006 | Iwaki et al. | 720/728 |
| 7,343,610 | B2 * | 3/2008 | Shibata | 720/713 |
| 7,802,272 | B2 * | 9/2010 | Kanzawa et al. | 720/707 |
| 7,849,474 | B2 * | 12/2010 | Kuramoto et al. | 720/707 |
| 7,877,764 | B2 | 1/2011 | Takaki et al. | |
| 7,979,873 | B2 * | 7/2011 | Ito et al. | 720/707 |
| 8,341,658 | B2 * | 12/2012 | Nakanishi et al. | 720/707 |
| 2002/0150027 | A1 * | 10/2002 | Kato | 369/270 |
| 2002/0150029 | A1 * | 10/2002 | Ezawa et al. | 369/271 |
| 2003/0026193 | A1 * | 2/2003 | Shiomi et al. | 369/270 |
| 2005/0071861 | A1 * | 3/2005 | Tanabe et al. | 720/710 |
| 2007/0192778 | A1 * | 8/2007 | Suzuki et al. | 720/706 |

(Continued)

FOREIGN PATENT DOCUMENTS

| | | |
|---|---|---|
| CN | 101097751 A | 1/2008 |
| JP | 3-048761 Y2 | 10/1991 |

(Continued)

OTHER PUBLICATIONS

Nakanishi et al.; "Turntable"; U.S. Appl. No. 12/842,275, filed Jul. 23, 2010.

(Continued)

*Primary Examiner* — Brian Miller
(74) *Attorney, Agent, or Firm* — Westerman, Hattori, Daniels & Adrian, LLP

(57) ABSTRACT

A turntable for a storage disk drive apparatus includes a plate member made of a ferromagnetic material and a central resin member arranged at the center of the plate member and formed into a single member by injection-molding a resin. The plate member includes a peripheral plate portion and a central plate portion positioned higher than the peripheral plate portion. The central plate portion includes a plate center hole defined at the center of the plate member. The central resin member includes a resinous cylinder portion extending through the plate center hole and defining a resin central through-hole, a disk guide portion arranged to guide a disk center hole, and a resinous connector portion arranged above the central plate portion to interconnect the resinous cylinder portion and the disk guide portion.

16 Claims, 19 Drawing Sheets

U.S. PATENT DOCUMENTS

| | | |
|---|---|---|
| 2008/0002288 A1 | 1/2008 | Takaki et al. |
| 2008/0127239 A1 | 5/2008 | Matsuda et al. |
| 2009/0064212 A1 | 3/2009 | Ito et al. |
| 2010/0309588 A1 | 12/2010 | Nakanishi et al. |
| 2011/0035763 A1* | 2/2011 | Nakanishi et al. ............ 720/695 |

FOREIGN PATENT DOCUMENTS

| | | |
|---|---|---|
| JP | 2000-113544 A | 4/2000 |
| JP | 2001-037141 A | 2/2001 |
| JP | 2004-146056 A | 5/2004 |
| JP | 2008-10071 A | 1/2008 |
| JP | 2008-130208 A | 6/2008 |
| JP | 2008-135129 A | 6/2008 |

OTHER PUBLICATIONS

Copending U.S. Appl. No. 12/796,080 by Nakanishi et al. filed Jun. 8, 2010.

Copending U.S. Appl. No. 12/842,275 by Nakanishi et al. filed Jul. 23, 2010.

U.S. Office Action dated Nov. 8, 2012, issued in copending U.S. Appl. No. 12/842,275.

* cited by examiner

A - A

B - B

TURNTABLE FOR A STORAGE DISK APPARATUS INCLUDING FERROMAGNETIC MATERIAL AND A RESIN MEMBER

BACKGROUND OF THE INVENTION

1. Field of the Invention

The present invention relates to a storage disk turntable, a motor and a storage disk drive apparatus.

2. Description of the Related Art

In a conventional storage disk drive apparatus, a motor is provided with a turntable for holding a storage disk. The turntable includes a turntable body and a center spindle. The turntable body is made of a magnetic material. The center spindle is made of a resin integrally formed with the turntable body.

In case of a structure in which the upper and lower surfaces of the rotor yoke are covered with a resin, it is likely that deformation such as sinkage occurs on the surface of the resin member in an injection molding process. It is also likely that a weld line is generated in the portion where a resin is finally filled. In the upper outer periphery of the resin member, there is provided an outer circumferential portion which is to be fitted to the center hole of a storage disk. If the sinkage occurs or the weld line is provided in the upper portion of the resin member, it becomes impossible to manufacture a disk guide portion with increased accuracy.

In case where the turntable includes a clamping magnet, a back yoke extends into the turntable. However, there is no need to have the back yoke extend into the turntable if the clamping magnet is provided in a clamper.

SUMMARY OF THE INVENTION

In order to overcome the problems described above, the present invention reliably prevents sinkage of a resin of a central resin member, particularly at a disk guide portion thereof.

In accordance with a first aspect of the invention, there is provided a turntable for a storage disk drive apparatus, including: a plate member made of a ferromagnetic material; and a central resin member arranged at the center of the plate member and formed into a single member by injection-molding a resin, wherein the plate member includes a peripheral plate portion and a central plate portion positioned higher than the peripheral plate portion, the central plate portion having a plate center hole defined at the center of the plate member, the central resin member including a resinous cylinder portion extending through the plate center hole and defining a resin central through-hole, a disk guide portion arranged to guide a disk center hole, and a resinous connector portion arranged above the central plate portion to interconnect the resinous cylinder portion and the disk guide portion.

In accordance with a second aspect of the invention, there is provided a turntable for storage disk drive apparatuses, including: a plate member made of a ferromagnetic material; and a central resin member arranged at the center of the plate member and formed into a single member by injection-molding a resin, wherein the plate member including a central plate portion having a plate center hole, the central resin member including a resinous cylinder portion extending through the plate center hole and defining a resin central through-hole, a disk guide portion arranged to guide a disk center hole, and a resinous connector portion arranged above the central plate portion to interconnect the resinous cylinder portion and the disk guide portion, the central resin member including an upper portion having a plurality of gate cut portions formed in an injection molding process.

In accordance with a third aspect of the invention, there is provided a method for manufacturing a turntable for a storage disk drive apparatus, which comprises the steps of: attaching a plate member made of a ferromagnetic material to one of two molds and creating a cavity by clamping the molds together with the plate member arranged between the molds; and forming a single central resin member at a center portion of the plate member by injecting a resin into the cavity, the central resin member including an upper portion, wherein, in the step of forming the central resin member, the resin is injected into the cavity from a plurality of gates provided in such positions as to correspond to the upper portion of the central resin member.

DETAILED DESCRIPTION OF THE INVENTION

Figure 1:
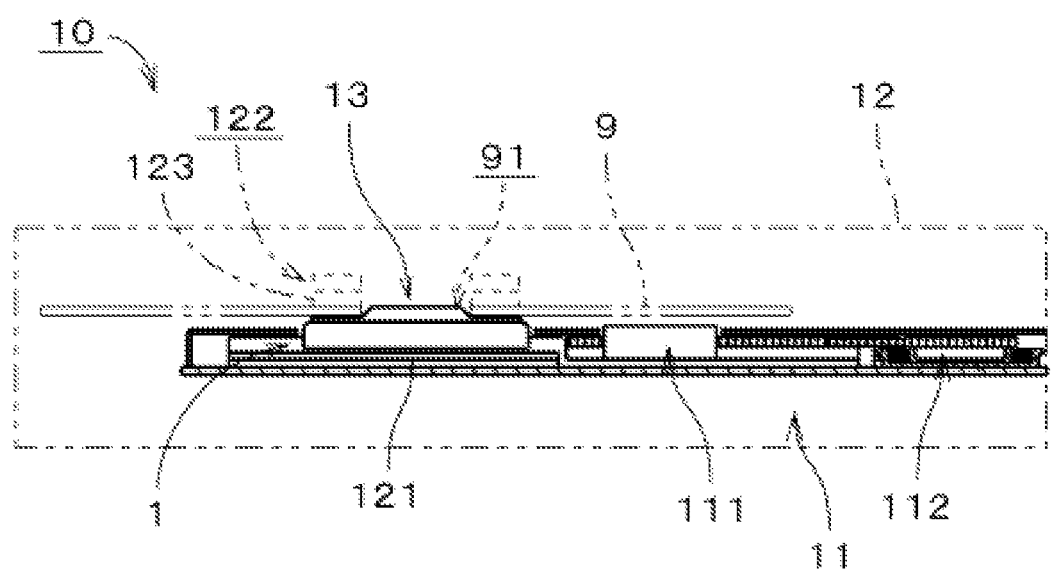
FIG. 1 is a sectional view showing a storage disk drive apparatus.

In the subject specification, the upper side in the direction of a center axis J1 is referred to as "upper" and the lower side as "lower". The terms "upper", "lower", "left" and "right" used in describing the respective members are intended to designate the positional relationship or direction in the drawings and not to designate the positional relationship or direction when actually mounted to devices.

FIG. 1 is a sectional view showing a storage disk drive apparatus 10 provided with a motor according to a first embodiment of the present invention, which view is taken along a plane containing the center axis of the storage disk drive apparatus 10. As shown, the storage disk drive apparatus 10 can include a motor 1, an access unit 11 and a box-like housing 12 arranged to accommodate the motor 1 and the access unit 11 therein. In FIG. 1, the housing 12, a clamper 122, a clamp magnet 123 and a storage disk 9 are indicated by double-dot chain lines. The motor 1 can be held in place by a chassis 121. The access unit 11 can include a head 111 and a head moving mechanism 112. The head 111 can be an optical pickup mechanism designed to perform a task of reading information from the storage disk 9 and/or a task of writing information on the storage disk 9. Examples of the storage disk 9 include a Blue-ray disc. The head moving mechanism 112 can move the head 111 with respect to the motor 1 and the storage disk 9. The head 111 can include a light-emitting portion and a light-receiving portion. The light-emitting portion can emit laser light toward the lower surface of the storage disk 9. The light-receiving portion can receive the light reflected from the storage disk 9.

A transfer mechanism (not shown) can be provided in the housing 12. The storage disk 9 can be inserted into or taken out of the housing 12 by the transfer mechanism. Furthermore, the clamper 122 having the clamp magnet 123 can be provided in the housing 12.

If the storage disk 9 is inserted into the housing 12, the central hole 91 of the storage disk 9 can be positioned above the turntable 13 of the motor 1. Then, the motor 1 can be moved upwards to mount the storage disk 9 on the turntable 13. The clamp magnet 123 can attract the metallic plate member of the turntable 13 from the above, and the storage disk 9 can be clamped on the turntable 13 by the clamper 122.

In the storage disk drive apparatus 10, the storage disk 9 can be rotated by the motor 1 and the head 111 can be moved to a desired position by the head moving mechanism 112 such that the head 111 can perform a task of reading information from the storage disk 9 and/or a task of writing information on the storage disk 9. When the storage disk 9 is taken out of the housing 12, the clamper 122 can be moved away from the storage disk 9 and the motor 1 is moved downwards, thereby allowing the storage disk 9 to be removed from the turntable 13.

Figure 2:
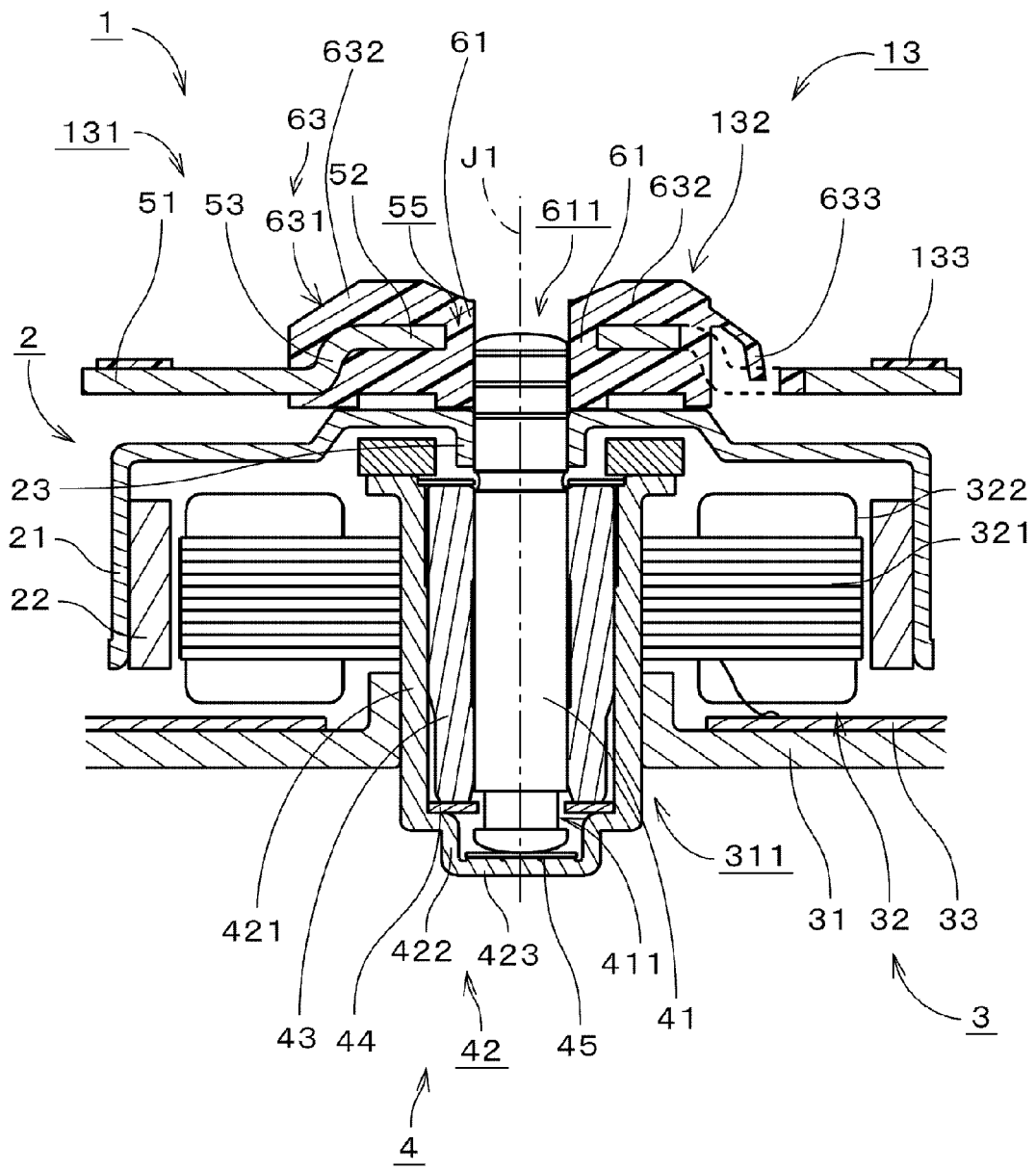
FIG. 2 is a sectional view showing a motor.

FIG. 2 is a vertical sectional view of the motor 1. As shown, the motor 1 can include a rotary unit 2 as a rotating assembly, a stationary unit 3 as a fixed assembly, the turntable 13 and a bearing mechanism 4. The rotary unit 2 can be supported above the stationary unit 3 by the bearing mechanism 4 such that the rotary unit 2 can rotate with respect to the stationary unit 3. The turntable 13 can be provided at the upper end of the rotary unit 2.

The rotary unit 2 can include a substantially cylindrical cup member 21 with the top and an annular rotor magnet 22. The rotor magnet 22 can be attached to the inner surface of the cylinder portion of the cup member 21. A substantially cylindrical shaft-fixing portion 23 can be provided in the center of the cup member 21. The bearing mechanism 4 can include a shaft 41 inserted into the shaft-fixing portion 23 and fixed to the cup member 21.

The stationary unit 3 can include a substantially flat base portion 31, a stator 32 and a circuit board 33. The circuit board 33 can be arranged on the base portion 31. The base portion 31 can be made of a metal having a central hole 311 to which the bearing mechanism 4 is attached. The stator 32 can include a stator core 321 and a plurality of coils 322 wound around the stator core 321. The stator core 321 can be formed of laminated steel plates. The stator 32 can be attached to the outer surface of a cylinder portion 421 of a sleeve retainer 42 and arranged opposite to the rotor magnet 22 in the direction perpendicular or substantially perpendicular to the center axis J1. When the motor 1 is driven, a magnetic interaction occurs between the rotor magnet 22 and the stator 32.

The bearing mechanism 4 can include the shaft 41, a substantially cylindrical sleeve retainer 42 with the bottom, a sleeve 43 and a substantially annular removal-preventing member 44. An annular groove 411 can be formed at the lower end portion of the shaft 41. The sleeve 43 can be made of an oil-containing porous metallic body. The sleeve retainer 42 can include a cylinder portion 421, an annular step portion 422 and a bottom portion 423. The diameter of the step portion 422 can be reduced at the lower end of the cylinder portion 421. The bottom portion 423 can be provided at the lower side of the step portion 422, closing the lower end of the sleeve retainer 42.

The removal-preventing member 44 can be made of an elastic material such as a resin and be placed on the step portion 422. The inner end portion of the removal-preventing member 44 can be positioned within the groove 411 of the shaft 41, preventing the shaft 41 from being removed out of the sleeve retainer 42. A disc-shaped thrust plate 45 can be provided inside the bottom portion 423. During the operation of the motor 1, the tip end of the shaft 41 bears against the thrust plate 45 such that the shaft 41 can be stably supported in the axial direction. In addition, the shaft 41 can be radially supported by the sleeve 43 with oil interposed therebetween.

The turntable 13 can include a disc-shaped plate member 131, an annular central resin member 132 and an annular rubber member 133. In FIG. 2, the inner portion of the plate member 131 is partially indicated by a broken line. The plate member 131 can be made of a soft ferromagnetic material and formed into a desired shape by a press work. The thickness of the plate member 131 can be uniform, which can be about 0.8 mm. The plate member 131 can be formed from, e.g., an electrogalvanized steel plate (SECC).

The plate member 131 can include a peripheral plate portion 51, a central plate portion 52 and a bent portion 53 lying between the peripheral plate portion 51 and the central plate portion 52. The peripheral plate portion 51 can be substantially perpendicular to the center axis J1. The central plate portion 52 can be substantially perpendicular to the center axis J1 and positioned higher than the peripheral plate portion 51. In the turntable 13 as shown in FIG. 1, a great enough magnetic interaction can be caused between the clamp magnet 123 and the peripheral plate portion 51 of the plate member 131. Therefore, the plate member 131 can be made of a soft ferromagnetic material and can be selected from low-priced materials. This makes it possible to manufacture the turntable 13 in a cost-effective manner.

The central resin member 132 can be arranged substantially at the center of the plate member 131 and formed by injection-molding a resin. The plate member 131 and the central resin member 132 can be integrated. The injection molding is more advantageous in shaping accuracy than a press work. More specifically, the mold components used in forming the central resin member 132 can be provided with a tolerance of about 5 µm to 10 µm, while the plate member 131 can be formed with a tolerance of about 50 µm. The central resin member 132 can protrude upwards beyond the peripheral plate portion 51. Since the central resin member 132 covers substantially all the central plate portion 52 and the bent portion 53, the plate member 131 can be prevented from being removed from the central resin member 132. The central resin member 132 can be made of a resin material, e.g., polycarbonate or any other desirable material.

The central resin member 132 can include a resinous cylinder portion 61, a disk guide portion 631, a resinous connector portion 632 and a plurality of claws 633. The central resin member 132 including these portions can be provided as a single piece member. The resinous cylinder portion 61 can be positioned inside the plate center hole 55 defined substantially at the center of the plate member 131. The resinous cylinder portion 61 can be provided with a central through-hole 611 extending through the plate center hole 55. The upper portion of the shaft 41 can be fixed into the central through-hole 611.

The disk guide portion 631 can be positioned in the upper outer periphery of the central resin member 132 and inclined radially outwards and downwards with respect to the center axis J1. The bent portion 53 of the plate member 131 can be bent to conform to the outer periphery shape of the disk guide portion 631. The resinous connector portion 632 can surround all the central plate portion 52 and interconnect the resinous cylinder portion 61 and the disk guide portion 631. In the central resin member 132, the disk guide portion 631 and the resinous connector portion 632 have an upper portion 63 that can be positioned higher than the plate member 131.

The claws 633 can be provided at plural points of the disk guide portion 631, namely the outer periphery of the upper portion 63. The claws 633 can extend radially outwards and downwards from the disk guide portion 631 with respect to the center axis J1. An undercut can be defined between the disk guide portion 631 and each of the claws 633. In the following description, the radial direction with respect to the center axis J1 is referred to as "radial" or "radially" and the circumferential direction just as "circumferential" or "circumferentially".

When the storage disk 9 as shown in FIG. 1 is mounted on the turntable 13, the disk center hole 91 of the storage disk 9 can be guided along the claws 633 by the disk guide portion 631. Thus, the claws 633 can come into contact with the disk center hole 91. Consequently, the storage disk 9 is arranged on the plate member 131. More precisely, the storage disk 9 can be mounted on the annular rubber member 133 on the plate member 131. In this state, the claws 633 can be elastically deformed radially inwards while they can be supported by the resinous connector portion 632. Use of the elastic deformation of the claws 633 makes it possible to accurately place the center of the storage disk 9 on the center axis J1. As a result, a storage disk such as a Blu-ray disk, which requires high centering performance, can be attached to the turntable 13 with increased accuracy.

Figure 3:
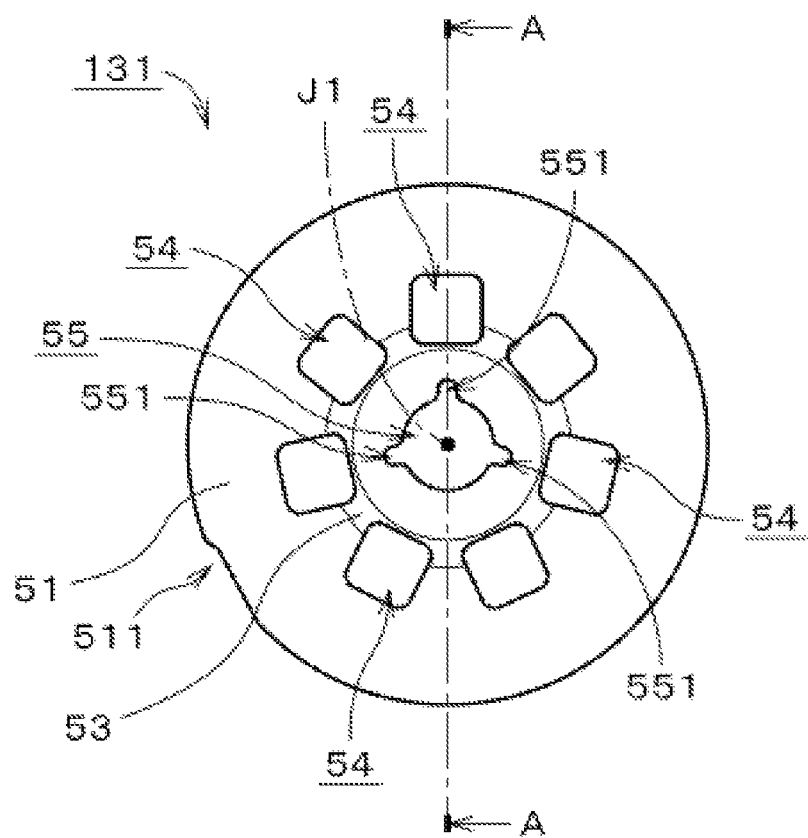
FIG. 3 is a top view showing a plate member.
Figure 4:
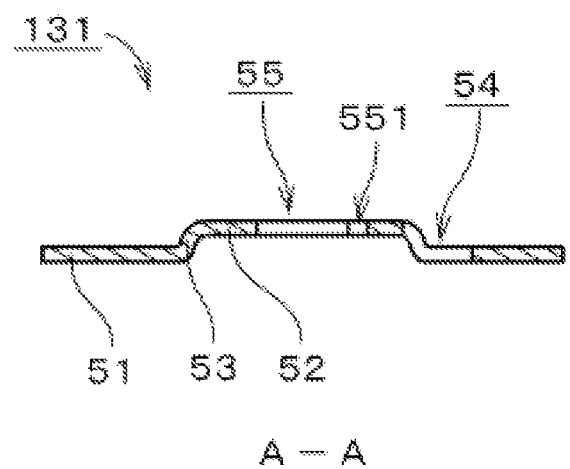
FIG. 4 is a sectional view of the plate member.

FIG. 3 is a top view of the plate member 131. FIG. 4 is a sectional view of the plate member 131 along line A-A in FIG. 3. Seven openings 54 can be circumferentially provided in the plate member 131 by punching the peripheral plate portion 51 and the bent portion 53 at seven points. Three cutouts 551 extending radially outwards from the plate center hole 55 can be provided in the plate center hole 55. As shown in FIG. 3, the cutouts 551 can extend in such a fashion that the angle between the adjacent ones with respect to the center of the plate center hole 55, i.e., the center axis J1, becomes greater than 90 degrees. An additional cutout 511 can be provided in the outer edge of the peripheral plate portion 51

Figure 5:
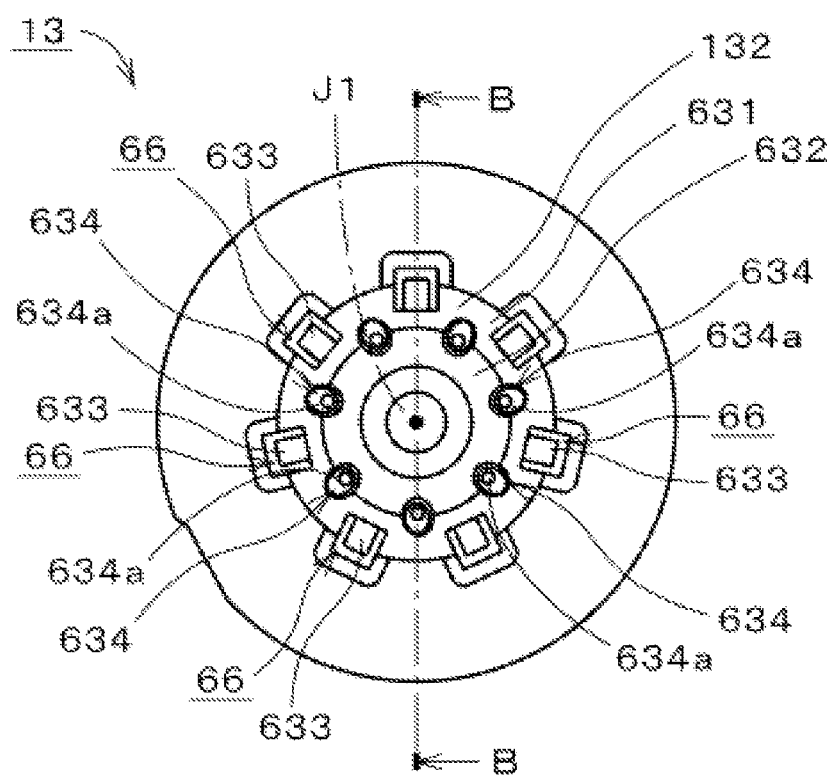
FIG. 5 is a top view showing a turntable.
Figure 6:
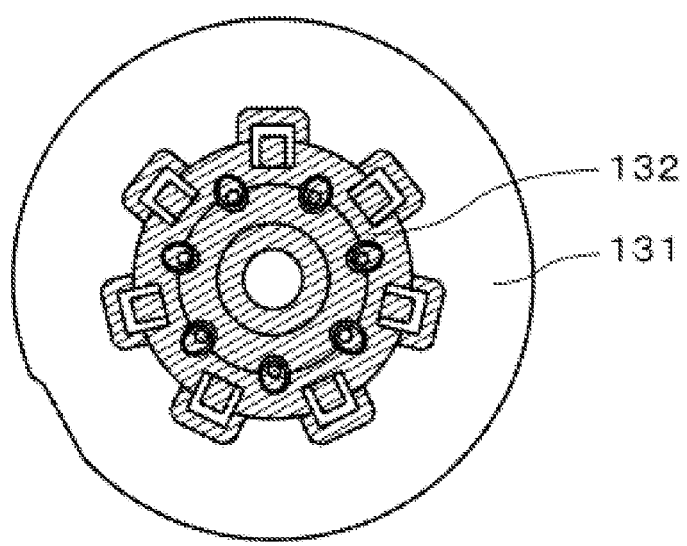
FIG. 6 is another top view of the turntable.
Figure 7:
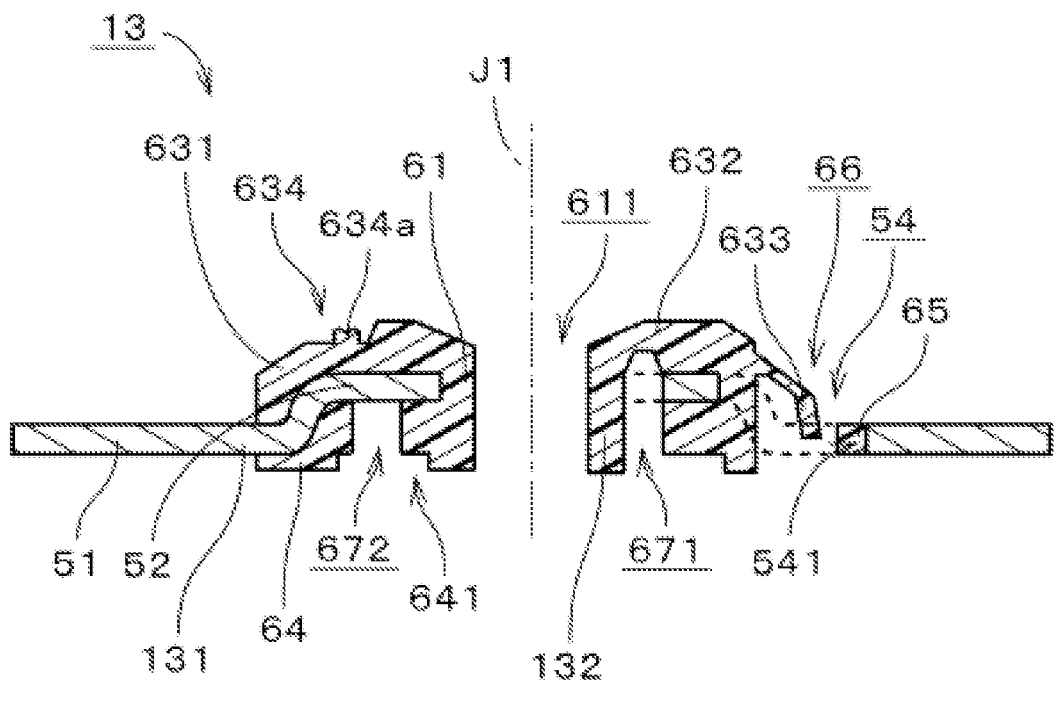
FIG. 7 is a sectional view of the turntable.

FIGS. 5 and 6 are top views of the turntable 13. The central resin member 132 is hatched in FIG. 6. FIG. 7 is a sectional view of the turntable 13 along line B-B in FIG. 5. In FIG. 7, the inner portion of the plate member 131 is partially indicated by a broken line. As shown in FIGS. 5 and 7, seven downwardly-indented recess portions 634 can be provided at an equal circumferential interval at the resinous connector portion 632 and the disk guide portion 631 such that they can extend over the resinous connector portion 632 and the disk guide portion 631. As will be discussed below, when injection-molding the central resin member 132, a resin can be injected into the cavity of a mold through the gates formed in a corresponding relationship with the recess portions 634. The resin can be severed at the gates when a molded product is removed from the mold. This creates gate cut portions 634a, raised gate vestiges, in the recess portions 634.

Figure 8:
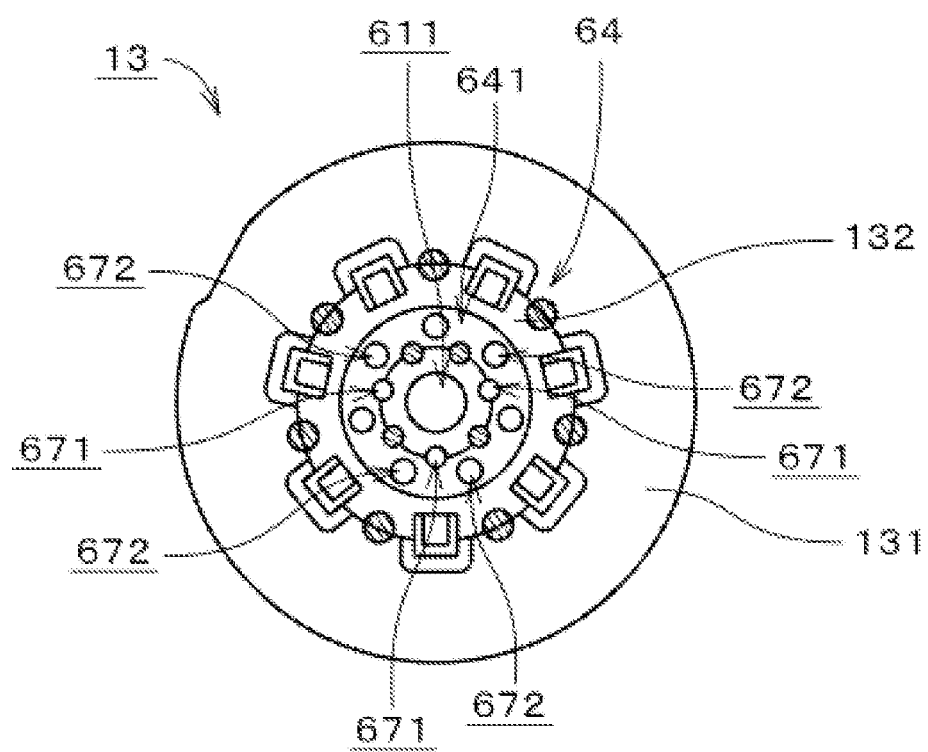
FIG. 8 is a bottom view of the turntable.
Figure 9:
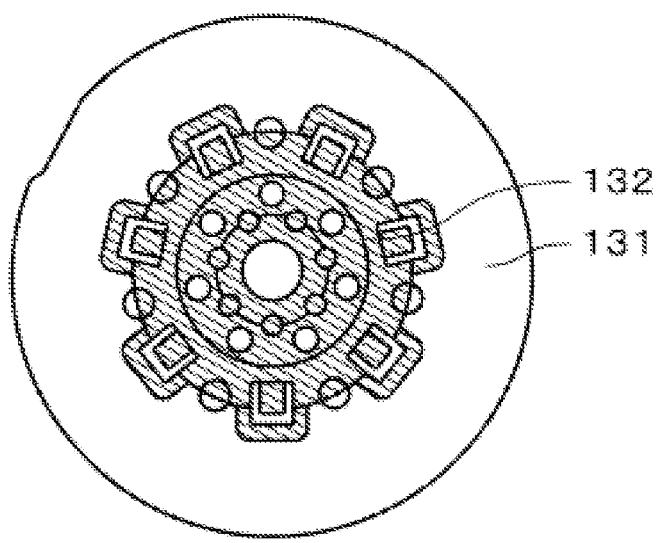
FIG. 9 is another bottom view of the turntable.

FIGS. 8 and 9 are bottom views of the turntable 13. The central resin member 132 is hatched in FIG. 9. As shown in FIGS. 7 and 8, an annular resin recess portion 641 indented upwards around the central through-hole 611 can be provided in the lower portion 64 of the central resin member 132 positioned lower than the plate member 131. Different kinds of pins can be arranged within the cavity when injection-molding the central resin member 132. Thus, a plurality of blind holes 671 and 672 as vestiges of the pins can be left in the resin recess portion 641.

Figure 10:
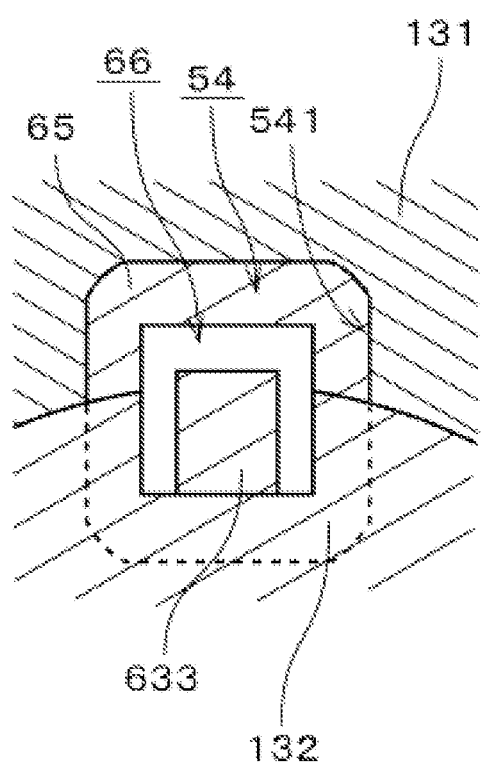
FIG. 10 is a view showing a claw on an enlarged scale.

FIG. 10 is an enlarged view of one of the claws 633 as shown in FIG. 5 and its vicinities. The central resin member 132 is widely hatched and the plate member 131 is narrowly hatched in FIG. 10. The portion of the edge 541 of each of the openings 54 of the plate member 131, which is covered with the central resin member 132, is indicated by a broken line. As can be seen in FIGS. 7 and 10, the central resin member 132 can be provided with a resin portion (or resin layer) 65 formed in the edge 541 of each of the openings 54.

The thickness of the resin portion 65 (or resin layer) in the direction perpendicular or substantially perpendicular to the center axis J1, namely the shortest distance between the edge 541 of each of the openings 54 and the inner periphery of the resin portion 65, can be set equal to or greater than 0.5 mm in an effort to prevent occurrence of resin shortage in an injection-molding process. More preferably, the thickness can be set equal to or greater than 0.7 mm such that the resin shortage can be reliably prevented even when the resin viscosity is high. In order to prevent the resin portion 65 from becoming too thick, the thickness can be set equal to or smaller than 1 mm. Various kinds of dimensions can be set in light of the fluidity of the resin and the tolerable dimension of the resin portion. The present invention shall not be limited to the numerical values noted above. As illustrated in FIGS. 9 and 10, the resin portion 65 is shaped in a ring to surround each of claws 633.

A claw position hole 66 accommodating each of the claws 633 in the direction parallel or substantially parallel to the center axis J1 is provided at the inner side of the resin layer 65. As shown in FIG. 7, the tip end of each of the claws 633 is positioned within the corresponding claw position hole 66. Referring back to FIG. 5, the claws 633 can be equal in number to the claw position holes 66. The claws 633 and the claw position holes 66 can be in a one-to-one correspondence relationship. The plate member 131 of this configuration can be more advantageous in strength than a conventional plate member having a single large circular opening formed in an overlapping relationship with a plurality of claw position holes.

Figure 11:
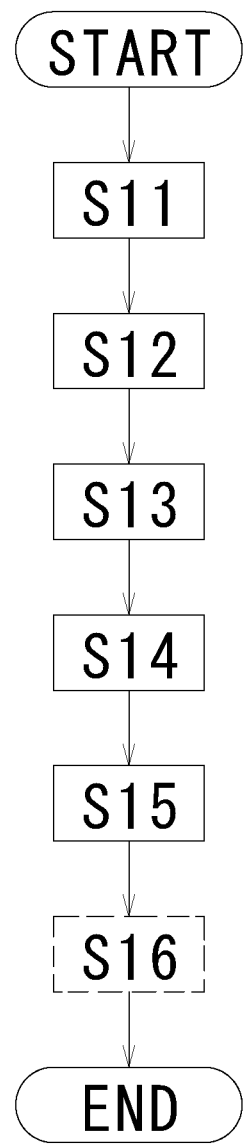
FIG. 11 is a flowchart illustrating a process for manufacturing the turntable.

Next, a process for manufacturing the turntable 13 is described with reference to FIG. 11. A plurality of plate members 131 can be first produced by a press work (step S11). The plate members 131 can be stored in a specified storage unit. Within the storage unit, the cutouts 511 (see FIG. 3) of the outer peripheral edge of the plate members 131 can be kept in contact with a rod-shaped member such that the circumferential positions, i.e., the circumferential orientations, of the plate members 131 can be uniform. In this way, the cutouts 511 can be used to provisionally determine the circumferential positions of the plate members 131 before each of the plate members 131 is attached to a mold. This makes it easy to attach each of the plate members 131 to the mold.

Figure 12:
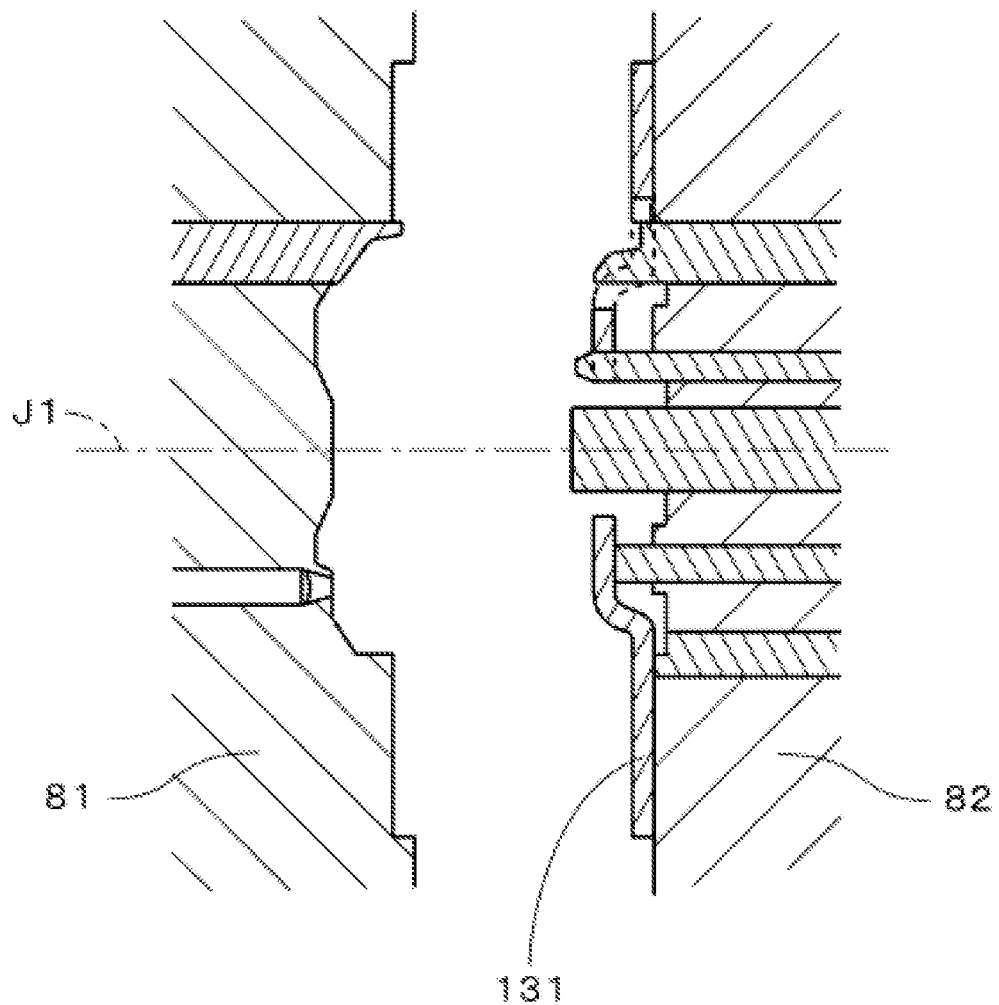
FIG. 12 is a view showing a mold and a plate member.
Figure 13:
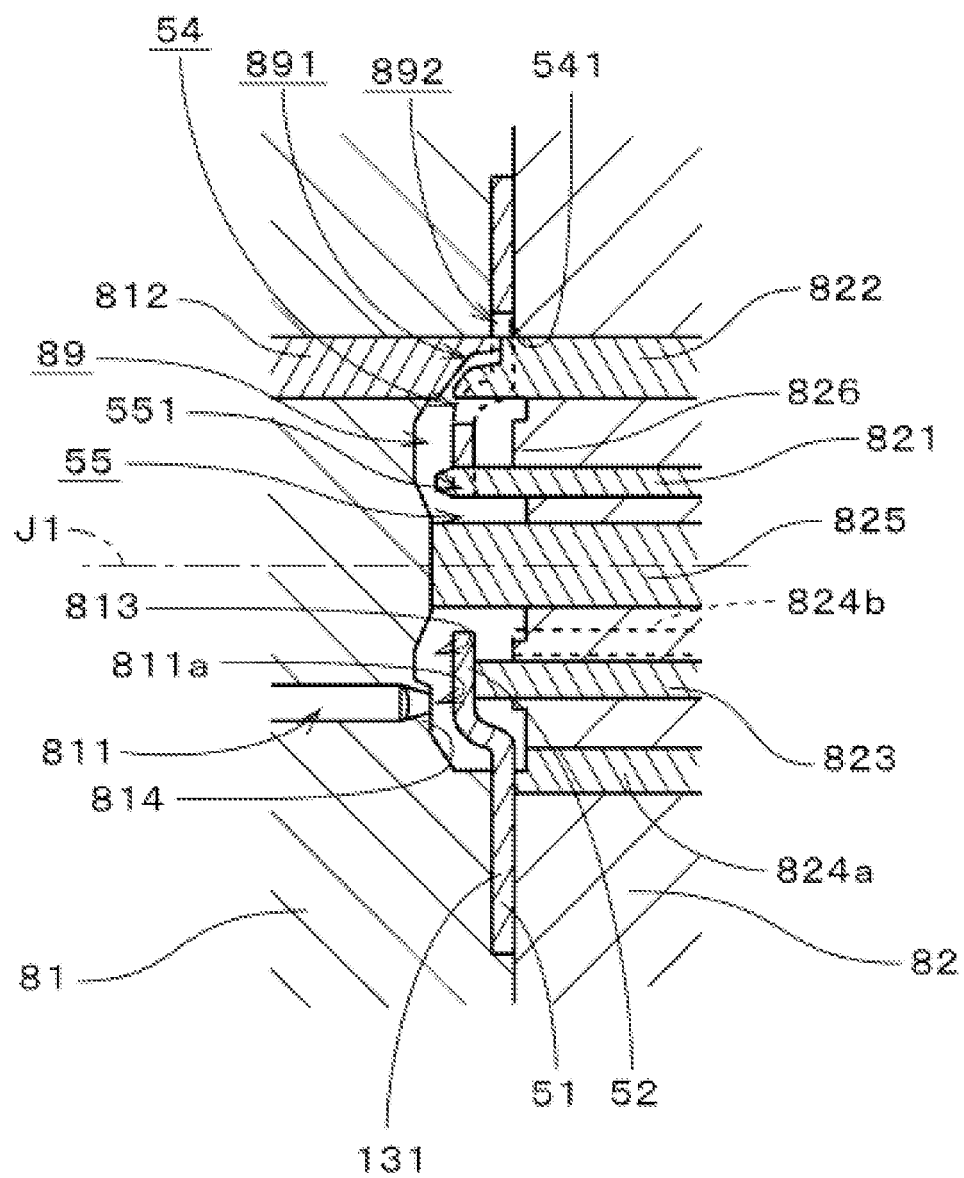
FIG. 13 is another view showing the mold and the plate member.

Then, one of the plate members 131 can be picked up by a transfer mechanism and be taken out of the storage unit. As shown in FIG. 12, the plate member 131 can be attached to a movable mold 82 by a magnetic action or an air suction force in a state that the center axis J1 of the plate member 131 can be oriented horizontally (step S12). The movable mold 82 and the plate member 131 can be moved toward a fixed mold 81 along the center axis J1. As illustrated in FIG. 13, the fixed mold 81 and the movable mold 82 are clamped together while the plate member 131 is interposed therebetween. A cavity 89 can be created between the fixed mold 81 and the movable mold 82 (step S13).

The fixed mold 81 can include flow paths 811 through which a resin is fed into the cavity 89 and first claw-forming parts 812 by which to form each of the claws. The first claw-forming parts 812 protrude toward the movable mold 82. An annular recess portion 813 coaxial with the center axis J1 is formed in the fixed mold 81. Raised portions 814 slightly protruding toward the central plate portion 52 are formed at seven circumferentially-spaced-apart points of the recess portion 813. The gates 811a of the flow paths 811 are positioned in the respective raised portions 814.

The movable mold 82 can be provided with different kinds of pins. Positioning pins 821 as a portion of the movable mold 82 can protrude toward the plate center hole 55 and are inserted into the cutouts 551. As the positioning pins 821 come into contact with the cutouts 551 in the direction perpendicular or substantially perpendicular to the center axis J1, the plate member 131 can be fixed with respect to the movable mold 82 in the direction perpendicular or substantially perpendicular to the center axis J1. In the following description, the cutouts 551 are referred to as "positioning portions 551". The circumferential width of the positioning portions 551 can be precisely equal to the diameter of the positioning pins 821, but can be varied. A small gap can be left between the positioning portions 551 and the positioning pins 821 as long as it secures a resin layer formation space 892 which will be described below.

Second claw-forming parts 822 by which to form the claws can be provided in the movable mold 82. The second claw-forming parts 822 protrude toward the first claw-forming parts 812. The first claw-forming parts 812 and the second claw-forming parts 822 can be respectively inserted into the openings 54 of the plate member 131. Claw-forming spaces 891 for forming the claws 633 can be created between first claw-forming parts 812 and the second claw-forming parts 822. In the direction perpendicular or substantially perpendicular to the center axis J1, resin portion formation spaces 892 for forming the resin portion 65 can be defined between the first and second claw-forming parts 812 and 822 and the edges 541 of the openings 54. The circumferential width between the positioning pins 821 and the positioning portions 551 can be smaller than the circumferential width between the first and second claw-forming parts 812 and 822 and the edges 541 of the openings 54.

An annular mold-side raised portion 826 coaxial with the center axis J1 can be formed on the surface of the movable mold 82 facing toward the fixed mold 81. A plurality of support pins 823 can protrude from the mold-side raised portion 826. The support pins 823 can come into contact with the lower surface of the central plate portion 52, namely the right surface of the central plate portion 52 shown in FIG. 13. The support pins 823 can be opposed to the gates 811a of the flow paths 811. The support pins 823 can support the central plate portion 52 against the resin stream flowing from the gates 811a.

Two kinds of release pins 824a and 824b for detaching a molded product from the movable mold 82 can be provided in the movable mold 82. The release pin 824a can be provided with a step portion formed at its tip end such that a portion of the tip end can make contact with the peripheral plate portion 51. The release pin 824b can be positioned radially inwards of the release pin 824a and opposed to the central plate portion 52. In fact, the release pin 824b can be provided in other position than the position shown in FIG. 13. A central pin 825 can be inserted into the plate center hole 55 of the central plate portion 52. The central pin 825 can make contact with the portion of the fixed mold 81 positioned radially inwards of the recess portion 813.

Once the fixed mold 81 and the movable mold 82 are clamped together, a resin under pressure can be injected into the cavity 89 from the gates 811a (step S14). The resin can be spread from the above to the bottom of the plate member 131. The resin can be fully filled in the cavity 89 including the claw-forming spaces 891 and the resin layer formation spaces 892. As discussed above, the central plate portion 52 can be supported by the support pins 823 of the movable mold 82. This prevents deformation of the central plate portion 52, which would otherwise be caused by the pushing action of a resin stream. As a result, it is possible to prevent axial dislocation of the peripheral plate portion 51.

Figure 14:
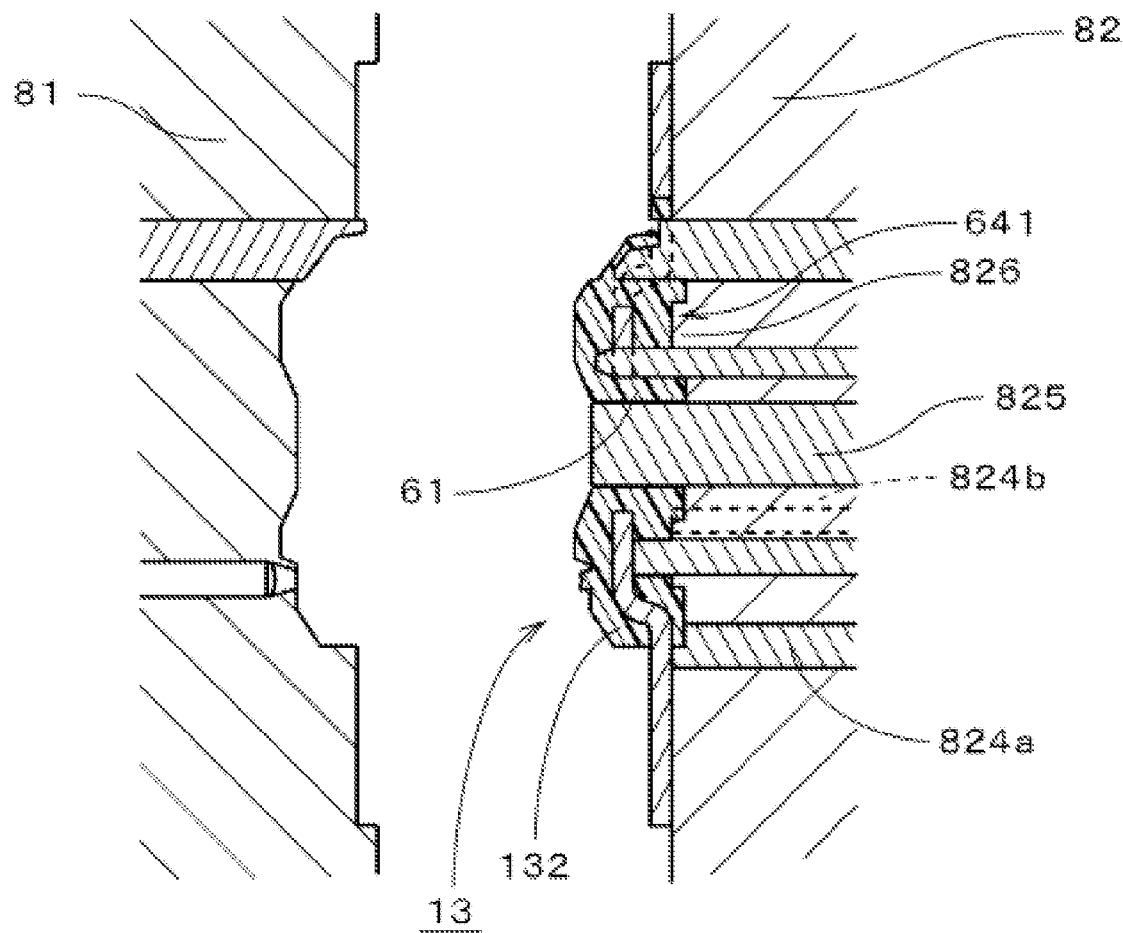
FIG. 14 is a further view showing the mold and the plate member.

When the resin is cured to form the central resin member 132, the movable mold 82 can moved away from the fixed mold 81 as illustrated in FIG. 14. At this time, the resinous cylinder portion 61 and the central pin 825 can make contact with each other, while the resin recess portion 641 and the mold-side raised portion 826 can be brought into contact with each other. Thus, the turntable 13 can be moved away from the fixed mold 81 together with the movable mold 82.

As being hatched in FIG. 8, the release pins 824a and 824b lightly press the turntable 13 at eleven points. At the same time, the turntable 13 can be attracted and held by the transfer mechanism. Therefore, the turntable 13 can be detached from the movable mold 82 (step S15).

As can be seen in FIG. 7, the claws 633 and the resin layers 65 of the central resin member 132 can be formed in the positions corresponding to the claw-forming spaces 891 and the resin layer formation spaces 892 shown in FIG. 13. The resin layers 65 cover the edges 541 of the openings 54, thereby defining the claw position holes 66 that overlap with the openings 54.

Upwardly-indented recess portions 671 (hereinafter referred to as "positioning-pin recess portions 671" can be formed in the resin recess portion 641 in a corresponding relationship with the positioning pins 821. The inner circumferential surfaces of the positioning portions 551 can be exposed within the positioning-pin recess portions 671. Upwardly-indented recess portions 672 (hereinafter referred to as "support-pin recess portions 672") can be formed in a corresponding relationship with the support pins 823. The lower surface of the plate member 131 can be partially exposed within the support-pin recess portions 672. As shown in FIG. 8, the positioning-pin recess portions 671 can be arranged between the support-pin recess portions 672 along the circumferential direction.

A slanting surface whose diameter gets gradually increased radially outwards can be formed in the inner extension of the resinous connector portion 632 shown in FIG. 7. As the fixed mold 81 and the central pin 825 shown in FIG. 13 can make contact with each other, a parting line can be formed between the slanting surface and the inner surface of the resinous cylinder portion 61. In the motor 1, the shaft 41 shown in FIG. 2 is positioned lower than the parting line, eliminating the possibility that that the shaft 41 and the parting line make contact with each other.

The turntable 13 can be brought into a specified container by the transfer mechanism. As shown in FIG. 7, the central plate portion 52 of the plate member 131 can protrude upwards beyond the peripheral plate portion 51. Thus, the thickness of the central resin member 132 can be small in the area above the plate member 131. As a result, sinkage in the disk guide portion 631 as a critical dimension portion can be prevented even in the turntable 13 in which the upper surface of the central plate portion 52 is fully covered with the resin.

In case of the plate member 131, the bent portion 53 and the central plate portion 52 can be formed to conform to the outer surface shape of the disk guide portion 631 and the resinous connector portion 632. The resin portion on the bent portion 53 and the central plate portion of the plate member 131 can be formed with a substantially uniform thickness. This helps prevent occurrence of resin sinkage.

Since the plate member 131 is provided with the central plate portion 52, the contact area can be increased between the central resin member 132 and the plate member 131. The central plate portion 52 can be positioned higher than the peripheral plate portion 51. This structure makes it possible to arrange the resin above and below the central plate portion 52, increasing the contact area between the central resin member 132 and the plate member 131. Therefore, it is possible to prevent the plate member 131 and the central resin member 132 from being separated from each other.

Inasmuch as the gates 811a of the flow paths 811 shown in FIG. 13 are positioned above the plate member 131, it is possible to accurately provide the disk guide portion 631 at the upper portion of the central resin member 132 and the claws 633 extending downwards from the upper portion of the disk guide portion 631. As can be seen in FIG. 5, the gate cut portions 634a can be situated between the claws 633 along the circumferential direction. In other words, each of the gates 811a can be positioned between the respective adjoining sets of the first claw-forming part 812 and the second claw-forming part 822 shown in FIG. 13. This prevents a weld line from being positioned in the disk guide portion 631.

The resin can be rapidly filled in the claw-forming spaces 891 because the gates 811a are arranged above the plate member 131. The claws 633 of the central resin member 132, which are thinner and required to have higher accuracy than the remaining portions, can accurately be formed without sinkage.

As shown in FIG. 7, the annular resin recess portion 641 can be provided in the lower portion 64 of the central resin member 132 by partially indenting the lower portion 64. This can reduce the resin thickness between the lower portion 64 and the plate member 131, preventing occurrence of resin sinkage in the lower portion 64. It is also possible to prevent occurrence of resin sinkage in the resinous cylinder portion 61.

After one turntable 13 is manufactured in this manner, a new plate member 131 is supplied from the storage unit. Then, steps S12 through S15 are performed to form the central resin member 132 on the plate member 131. As stated above, a plurality of turntables 13 can be manufactured one after another. The annular rubber member 133 can be bonded to the plate member 131 in the subsequent step.

The resin portion 65 formed between the edges 541 of the openings 54 and the claw position hole 66 can be removed from the turntable 13 after step S15 in which the central resin member 132 is detached from the fixed mold 81 and the movable mold 82 (step S16). This helps the turntable 13 to be lightweight. The steps of removing the resin layers 65 can be collectively performed after a plurality of turntables 13 has been manufactured.

As discussed above, the first and second claw-forming parts 812 and 822 can be kept out of contact with the openings 54 of the plate member 131 in the process of manufacturing the turntable 13. This makes it possible to reliably prevent the first and second claw-forming parts 812 and 822 from physically interfering with the plate member 131. The invention prevents occurrence of damage in the first and second claw-forming parts 812 and 822.

In case where the first and second claw-forming parts 812 and 822 make contact with the edges 541 of the openings 54 of the plate member 131, unintentional fine gaps may be generated between the first and second claw-forming parts 812 and 822 and the edges 541 of the openings 54 of the plate member 131 due to the low manufacturing accuracy of the plate member 131. The resin may enter the gaps, thus producing burrs. In the present turntable 13, the first and second claw-forming parts 812 and 822 can be sufficiently spaced apart from the edges 541 of the openings 54 of the plate member 131 so that the resin layers 65 can be formed by positively filling the resin between them. The invention eliminates generation of the burrs.

Use of the insert-molding makes it possible to manufacture the turntable 13 through a reduced number of steps and with increased accuracy. Since the plate member 131 does not require high shaping accuracy, it can be shaped by a cost-effective press work.

The central resin member 132 can be designed such that the tip ends of the claws 633 exists within the claw position holes 66. This helps reduce the force required in separating the first and second claw-forming parts 812 and 822 from the claws 633 during the injection-molding process.

When injection-molding the resin, the position of the plate member 131 relative to the fixed mold 81 and the movable mold 82 can be determined in the central plate portion 52. This makes it possible to increase the area of the peripheral plate portion 51 axially opposed to the clamp magnet 123.

In case where positioning holes are provided in the peripheral plate portion 51, it is likely that the peripheral plate portion 51 may be deformed due to the presence of the positioning holes. In the present invention, the positioning task is performed by the positioning portions 551. This makes it possible to secure the planarity of the peripheral plate portion 51 and to make substantially uniform the distance between the peripheral plate portion 51 and the clamp magnet 123 at the respective circumferential positions. Therefore, a stable magnetic attraction force becomes available between the plate member 131 and the clamp magnet 123.

Since the positioning portions 551 of the plate member 131 are in the form of cutouts, the positioning pins 821 can be readily inserted into the positioning portions 551. This makes it easy to fix the plate member 131 to the fixed mold 81 and the movable mold 82. The number of the positioning portions 551 can be three, which makes it possible to stably determine the position of the plate member 131 in the direction perpendicular or substantially perpendicular to the center axis J1.

Figure 15:
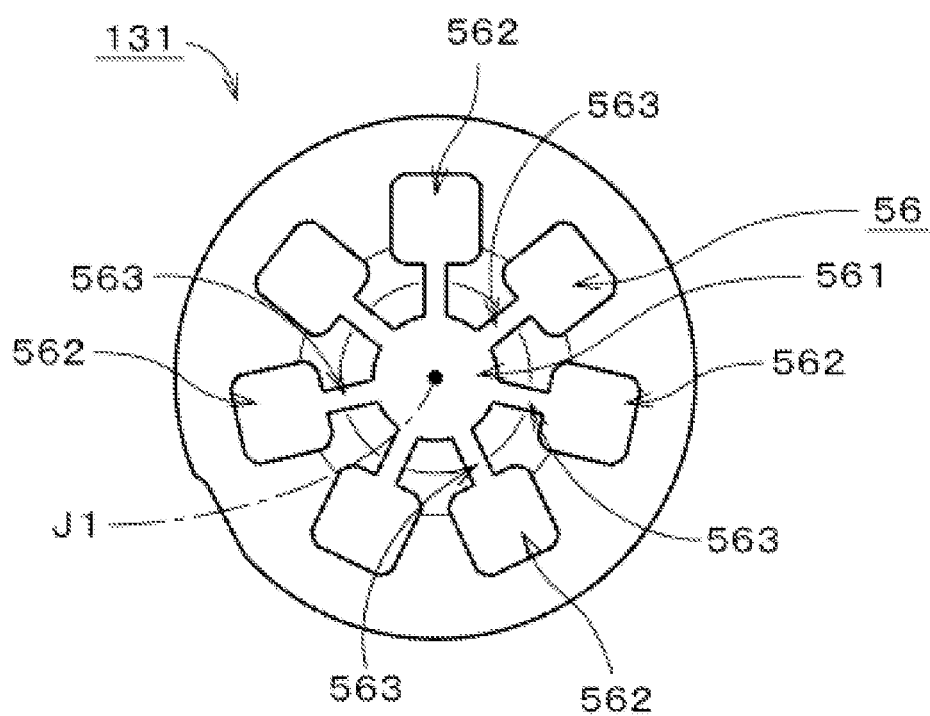
FIG. 15 is a top view showing a plate member of another example.

FIG. 15 is a view showing a plate member of another example. This plate member 131 can be provided with a single opening 56 in which the plate center hole 55 of the plate member 131 shown in FIG. 3 is into communication with the openings 54 thereof. In the following description, the portion of the opening 56 corresponding to the plate center hole 55 is referred to as "central hole portion 561", and the portion of the opening 56 corresponding to the openings 54 as "peripheral openings 562". The cutouts that bring the central hole portion 561 and the peripheral openings 562 into communication with each other are designated by reference numeral "563". Other shapes of the plate member 131 shown in FIG. 15 can be the same as the corresponding shapes of the plate member 131 shown in FIG. 3. In the following description, the same configurations are designated by like reference numerals.

A central resin member 132 having the same shape as shown in FIG. 5 can be formed on the plate member 131 by injection-molding. As in FIG. 7, the central resin member 132 can be provided with resin layers 65 covering the edges of the peripheral openings 562. Claw position holes 66 can be provided at the inner sides of the resin layers 65. In the plate member 131, the peripheral openings 562 illustrated in FIG. 15 can be formed in plural numbers to overlap with the claw position holes 66 shown in FIG. 7. This helps increase the post-molding strength of the central resin member 132, as compared with a conventional plate member having a single large circular opening to be overlapped with the claw position holes 66.

In the course of injection-molding the central resin member 132, the first and second claw-forming parts 812 and 822 shown in FIG. 13 can be kept out of contact with the edges 541 of the peripheral openings 562. This helps reliably prevent the first and second claw-forming parts 812 and 822 from physically interfering with the plate member 131. The positioning pins 821 can be inserted into the cutouts 563 shown in FIG. 15 in such a state that the plate member 131 is arranged within the molds. The cutouts 563 can serve as positioning portions. The plate member 131 can be fixed in position relative to the molds in the direction perpendicular or substantially perpendicular to the center axis J1.

Figure 16:
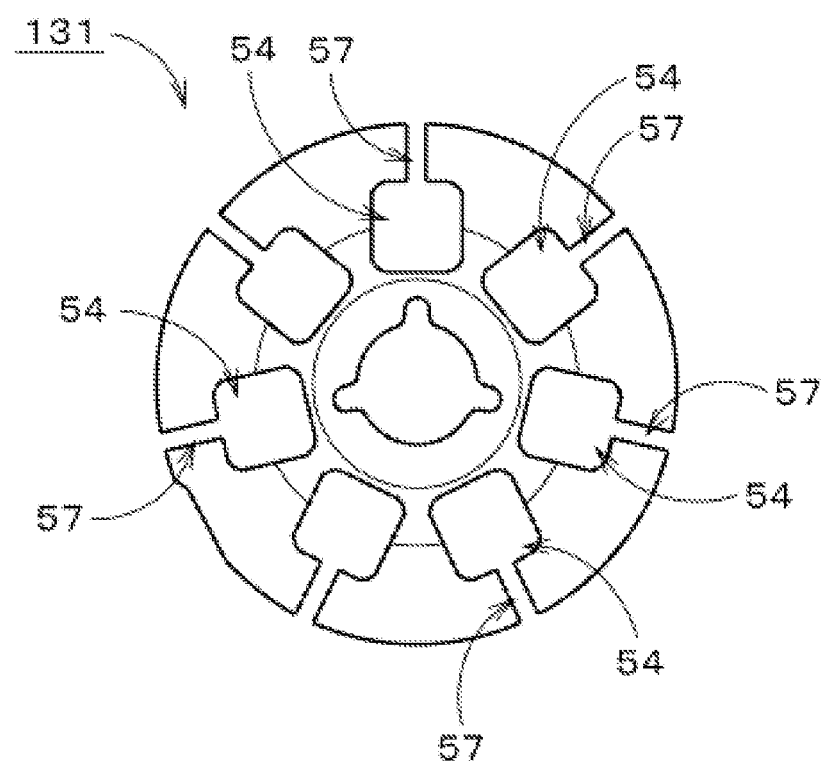
FIG. 16 is a top view showing a plate member of a further example.

FIG. 16 is a top view showing a plate member of a further example. The plate member 131 can be provided with seven cutouts 57 extending radially outwards from the openings 54. Other shapes of the plate member 131 shown in FIG. 16 can be substantially the same as the corresponding shapes of the plate member 131 illustrated in FIG. 3.

Figure 17:
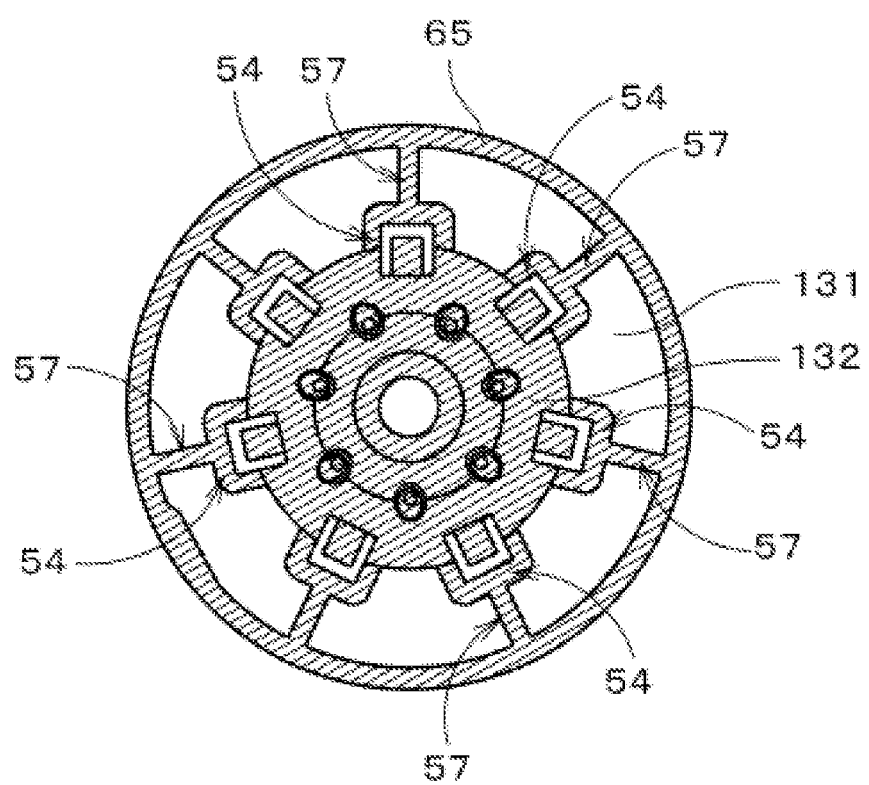
FIG. 17 is a top view showing a turntable.

In the process of injection-molding the central resin member 132, the plate member 131 can be arranged within the molds in such a fashion that a minute gap can be left between the outer peripheral portion of the plate member 131 and the molds. Consequently, the resin layers 65 formed in the openings 54 can extend through the cutouts 57 and cover the outer peripheral portion of the plate member 131 as illustrated in FIG. 17.

In case of the plate member 131, the first and second claw-forming parts 812 and 822 shown in FIG. 13 can be kept out of contact with the openings 54. This helps reliably prevent the first and second claw-forming parts 812 and 822 from physically interfering with the plate member 131. The portion of the resin layer 65 covering the outer peripheral portion of the plate member 131 can be removed in the subsequent step.

Figure 18:
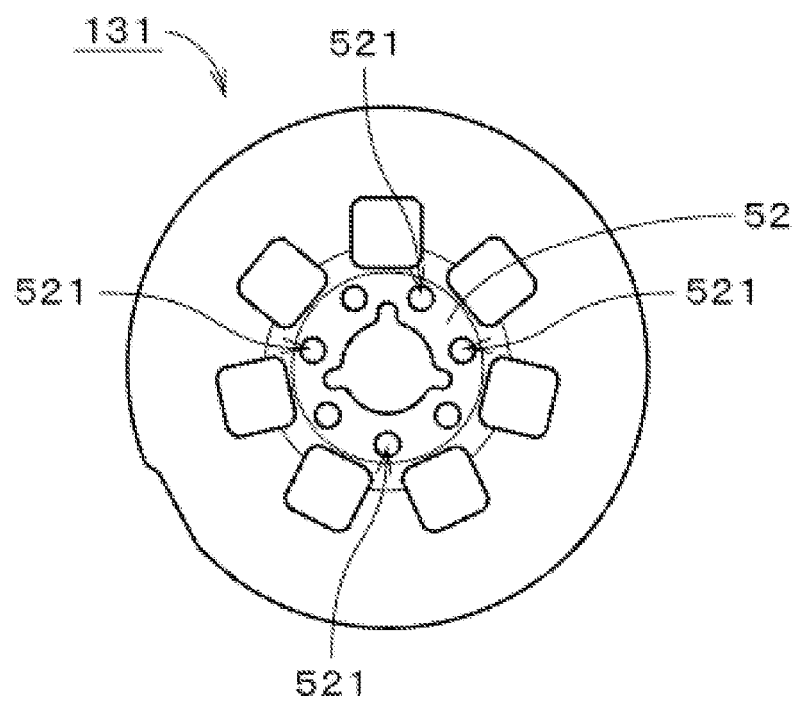
FIG. 18 is a top view showing a plate member of a still further example.

FIG. 18 is a top view showing a plate member 131 of a still further example. Seven hole portions 521 can be formed in the central plate portion 52 of the plate member 131 at the positions opposed to the gates 811a shown in FIG. 13. The support pins 823 can be omitted from the movable mold 82. When forming the central resin member 132, a resin can be injected toward the hole portions 521 from the gates 811a. The central plate portion 52 is not strongly pressed by the resin stream, preventing deformation of the central plate portion 52. As a consequence, it is possible to prevent axial dislocation of the peripheral plate portion 51.

After the central resin member 132 is molded as above, gate cut portions 634a can be formed as illustrated in FIGS. 5 and 7. The gate cut portions 634a can be opposed to the hole portions 521 in the direction parallel or substantially parallel to the center axis J1. Alternatively, the plate member 131 can be provided with cutouts in place of the hole portions 521.

While one embodiment of the present invention is described hereinabove, the present invention shall not be limited thereto but can be modified in many different forms. For example, the tip ends of the claws 633 can be positioned above or below the claw position holes 66 as long as the claws 633 and the claw position holes 66 overlap with each other in the direction parallel or substantially parallel to the center axis J1, namely so long as the claws 633 and the claw position holes 66 overlap with each other when the central resin member 132 is seen in a top view. The number of the claws 633 can be two or any other number greater than two. The number of the claws 633 can be set equal to five through seven in order to reduce the influence of one damaged claw 633 on the remaining claws 633. The number of the positioning portions 551 can be two or any other number greater than two. Although the positioning portions 551 employed in the first preferred embodiment can be in the form of cutouts, it can alternatively employ hole-shaped positioning portions. In case of the plate member 131 shown in FIG. 3, it is not always necessary that the claw position holes 66 and the openings 54 are equal in number, so long as there can be provided a plurality of openings overlapped with the claw position holes 66.

There is no need for the upper surface of the central plate portion 52 to be fully covered with the resinous connector portion 632. A turntable of other shape can be employed, as long as the resinous cylinder portion 61 and the disk guide portion 631 are connected to each other by the resinous connector portion 632 at least in some regions on the upper surface of the central plate portion 52. Even in such an instance, occurrence of resin sinkage in the disk guide portion 631 can be prevented because the central plate portion 52 of the plate member 131 is positioned higher than the peripheral plate portion 51. In the central resin member 132, the upper portion 63 and the lower portion 64 arranged above and below the central plate portion 52 are substantially equal to each other in thickness. However, the upper portion 63 and the lower portion 64 can differ in thickness from each other in case where deformation such as resin sinkage or the like occurs in the upper portion 63 and the lower portion 64.

When the central resin member 132 is injection-molded in the embodiments described above, the fixed mold 81 and the movable mold 82 can be clamped together in a state that the plate member 131 is attached to the fixed mold 81 rather than the movable mold 82. If the fixed mold 81 is provided with a mechanism for detaching the turntable, the movable mold 82 can be moved away from the fixed mold 81 with the turntable held by the fixed mold 81.

Figure 19:
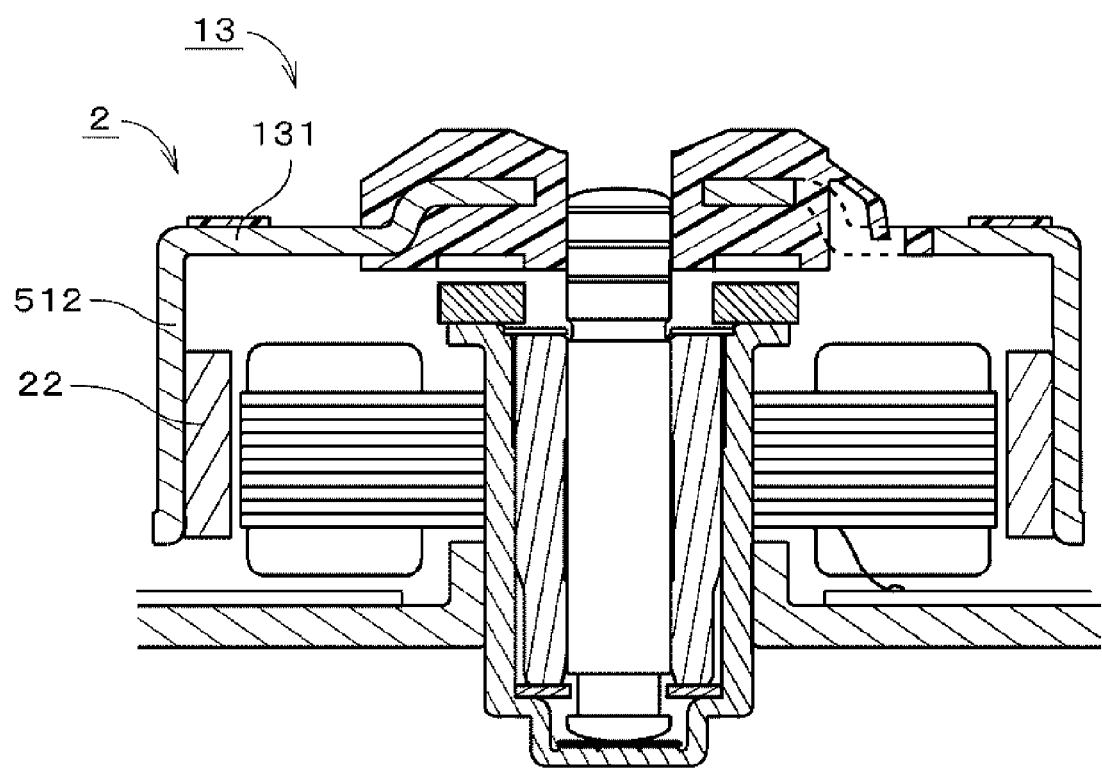
FIG. 19 is a sectional view of a motor, illustrating a plate member of a yet still further example.

In case of the embodiment described above, a cylinder portion 512 corresponding to the cup member 21 shown in FIG. 2 can be provided in the outer peripheral portion of the plate member 131 as illustrated in FIG. 19. In this case, the turntable 13 can be provided at the upper end of the rotary unit 2. A rotor magnet 22 can be arranged inside the cylinder portion 512. The motor 1 can be mounted to other kinds of storage disk drive apparatuses such as a hard disk drive and the like.

The present invention can be used in various kinds of storage disk drive apparatuses.

What is claimed is:
1. A turntable for a storage disk drive apparatus, comprising:
a plate member made of a ferromagnetic material, the plate member comprising:
a peripheral plate portion; and
a central plate portion positioned higher than the peripheral plate portion, the central plate portion having a plate center hole at the center of the plate member; and a central resin member arranged at the center of the plate member and provided as a single piece member by injection-molding a resin, the central resin member comprising:
- a resinous cylinder portion extending through the plate center hole and providing a resin central through-hole;
- a disk guide portion to guide a disk center hole; and
- a resinous connector portion above the central plate portion to continuously interconnect the resinous cylinder portion and the disk guide portion.

2. The turntable of claim 1, wherein the central resin member further comprises an upper portion having a plurality of gate cut portions from the injection molding process.

3. The turntable of claim 2, wherein the central resin member further comprises a lower portion positioned below the plate member, the lower portion including support-pin recess portions formed by a plurality of support pins making contact with the lower surface of the central plate portion.

4. The turntable of claim 2, wherein the central plate portion of the plate member includes cutouts or hole portions in an opposing relationship with the gate cut portions.

5. The turntable of claim 2, wherein the central plate portion includes an upper surface fully covered with the central resin member.

6. The turntable of claim 2, wherein the central resin member further comprises an outer peripheral portion and a plurality of claws extending downwards from the outer peripheral portion, the gate cut portions being alternately positioned between the claws along a circumferential direction.

7. The turntable of claim 1, wherein the central resin member further comprises a lower portion positioned below the plate member and upwardly-indented recess portions at the lower portion around the resin central through-hole.

8. The turntable of claim 1, wherein the plate member is a member shaped by a press work.

9. A motor comprising:
- a stationary unit;
- a bearing mechanism;
- a rotary unit supported by the bearing mechanism, the rotary unit being rotatable with respect to the stationary unit; and
- the turntable of claim 1 provided at an upper end of the rotary unit.

10. A storage disk drive apparatus comprising:
- the motor of claim 9 provided to rotate a storage disk;
- a clamper to clamp the storage disk against the turntable, the clamper comprising a clamp magnet to attract the plate member from thereabove;
- an access unit to perform a task of reading information from the storage disk and/or a task of writing information on the storage disk; and
- a housing to accommodate the motor and the access unit.

11. A turntable for storage disk drive apparatuses, comprising:
- a plate member made of a ferromagnetic material the plate member comprising a central plate portion having a plate center hole; and
- a central resin member arranged at the center of the plate member and provided as a single piece member by injection-molding a resin, the central resin member comprising:
- a resinous cylinder portion extending through the plate center hole and defining a resin central through-hole;
- a disk guide portion to guide a disk center hole,
- a resinous connector portion above the central plate portion to continuously interconnect the resinous cylinder portion and the disk guide portion, and
- an upper portion having a plurality of gate cut portions from the injection molding process.

12. The turntable of claim 11, wherein the central resin member further comprises an outer peripheral portion and a plurality of claws extending downwards from the outer peripheral portion, the gate cut portions being alternately positioned between the claws along a circumferential direction.

13. The turntable of claim 11, wherein the central resin member further comprises a lower portion positioned below the plate member and upwardly-indented recess portions at the lower portion around the resin central through-hole.

14. The turntable of claim 11, wherein the plate member is a member shaped by a press work.

15. A motor comprising:
- a stationary unit;
- a bearing mechanism;
- a rotary unit supported by the bearing mechanism, the rotary unit being rotatable with respect to the stationary unit; and
- the turntable of claim 11 provided at an upper end of the rotary unit.

16. A storage disk drive apparatus comprising:
- the motor of claim 15 to rotate a storage disk;
- a clamper to clamp the storage disk against the turntable, the clamper including a clamp magnet arranged to attract the plate member from thereabove;
- an access unit to perform a task of reading information from the storage disk and/or a task of writing information on the storage disk; and
- a housing to accommodate the motor and the access unit.

* * * * *